United States Patent Office

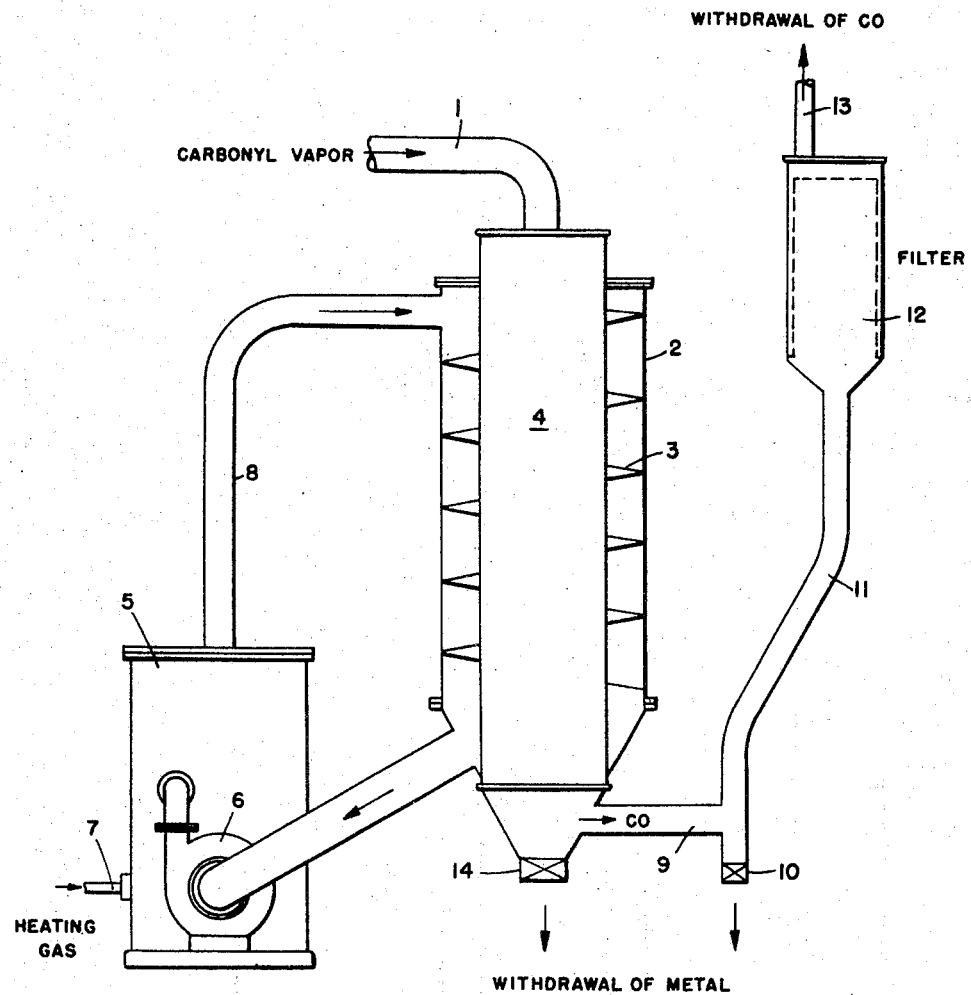

2,851,347
Patented Sept. 9, 1958

2,851,347

MANUFACTURE OF IRON POWDER

Leo Schlecht, Ludwigshafen (Rhine), Ernst Oestreicher, Ludwigshafen (Rhine) Oppau, and Friedrich Bergmann, Ludwigshafen (Rhine), Germany, assignors to Badische Anilin- & Soda-Fabrik Aktiengesellschaft, Ludwigshafen (Rhine), Germany Application March 2, 1956, Serial No. 569,210

Claims priority, application Germany October 21, 1949

4 Claims. (Cl. 75—.5)

This invention relates to the production of iron powder by thermal decomposition of iron carbonyl and, particularly, to the production of iron powder having an extremely small particle size.

This application is a continuation-in-part of our copending application Serial Number 191,086, filed October 19, 1950, and now abandoned.

Iron powder having a very small particle size is especially desirable for use in magnetic materials in the electrical field. Besides a suitable carbon content, the particle size is very important for high frequency and ultra high frequency applications, and for these purposes, iron powder having a particle size which does not exceed 5 microns is highly desirable.

Such very fine iron powder also affords considerable advantages in powder metallurgical applications. The fine powders sinter at low temperatures, and sintered articles are produced which, unlike sintered articles made from coarser powders, can be transformed without difficulty by pressure methods, such as hammering or rolling, into semifinished products without the formation of undesirable cracks. The fine powders markedly facilitate the formation of alloys with other metal powders, enabling the rapid production of homogeneous alloys and, where desired, a high pore volume.

The principal object of this invention is to provide an improved method or process for producing iron powder in which the particle size of at least about 80 percent by weight of the particles does not exceed 5 microns and, particularly, to avoid the special measures which were previously required and provide a very simple process which markedly increases the quantity of fine powder produced.

The invention is particularly concerned with the production of iron powder by thermal decomposition of iron carbonyl vapor in the hot free space of a decomposition chamber or vessel. In accordance with the invention, the surprising discovery has been made that iron powder in which the particle size of at least about 80 percent by weight of the particles does not exceed 5 microns is produced by decomposing at least about 22 kilograms per hour of iron carbonyl per cubic meter of decomposition space. The decomposition temperature is maintained within the range of 200° C. to 300° C.

In the same manner there is produced iron powder in which the particle size of substantially all of the particles does not exceed 5 microns by decomposing at least about 30 kilograms per hour of iron carbonyl per cubic meter of decomposition space. In this manner, particles below 5 microns are produced which have a low carbon content and good magnetic properties, especially for high frequency purposes; at the same time, the quantity produced is much greater than by prior methods.

Iron powder characterized by a very small particle size, in which substantially all of the particles do not exceed 3 microns, is produced by decomposing at least about 43 kilograms of iron carbonyl/hr./m.³. The particle size is further reduced so that substantially all of the particles do not exceed 2 microns by decomposing at least about 46 kg./hr./m.³. "Substantially all" as employed herein means about 95% or greater.

At the same time, the temperature in the decomposition space is maintained within the range of 200° C. to 300° C., to produce the desired low carbon content and good magnetic properties. Preferably, the decomposition temperature is maintained within the range of 230° C. to 280° C., and it is further preferred to carry out the decomposition at about 260° C. to 270° C. The carbonyl vapor is also preferably mixed with a small amount of ammonia, in known manner, to reduce the quantity of free carbon in the powder.

Part of the heat required may be supplied directly in the decomposition space, and at least part is supplied through the wall of the decomposition chamber. The heat supplied through the wall of the chamber is supplied in such a manner that the temperature of the inner surface of the wall is above the decomposition temperature of the carbonyl but not substantially higher than the decomposition temperature of carbon monoxide.

Prior to the invention, a number of processes have been proposed for producing finely divided iron from iron carbonyl vapor, wherein vaporous or gaseous iron carbonyl was introduced into a chamber externally heated to temperatures above the decomposition temperature of the carbonyl, the decomposition taking place substantially in the hot free space of the chamber at a distance from the hot walls of the chamber. In this manner, iron powder was produced having a particle size predominantly between 2 and 10 microns, with a considerable proportion larger than 5 microns.

To produce the powder below 5 microns in particle size desired for high frequency purposes, several methods have been proposed. For example, one method involved the dilution of the iron carbonyl vapor with thirty or more volumes of carbon monoxide. In this manner, there was an effect on size due to dilution and the gases passed through the decomposition chamber at 30 or more times the speed of the gases when iron carbonyl alone was supplied to the chamber. Another method involved applying reduced pressure from the chamber exit, for example, down to 20 millimeters of mercury, which correspondingly increased the speed of passage of the materials through the chamber. Also, it was proposed to limit the time of the iron particles in the decomposition zone to 20 seconds. These measures, while producing fine particles, are limited by the low quantitative production of iron powder. They also require special measures for carrying out the decomposition, for recovering the iron powder, and for purifying the iron powder, especially when undecomposed carbonyl remains.

Prior to the present invention, it was thought that the quantitative decomposition of iron carbonyl per unit of time and space was limited, due to the previously observed increase in carbon content, which made the powder unsuitable for high frequency applications.

The process of the invention may be carried out in an apparatus, such as that illustrated in the accompanying drawing. There, a decomposition chamber 4 is illustrated which is heated by a hollow jacket 2 surrounding the chamber through which heating gases circulate. The heat necessary for the decomposition of iron carbonyl is produced in the oil or bas burner 5 into which oil or gases to be burnt are introduced through the pipe 7. The hot gases then are introduced into the jacket 2 through the pipe 8 and are led around the chamber by means of baffle plates 3 and drawn off at the lower part of the jacket by means of a blower 6 from which the gases are recycled into the burner 5 in order to be heated again. The iron carbonyl vapor is introduced into the chamber through pipe 1 and is decomposed into iron powder and carbon monoxide. The carbon monoxide is withdrawn from the chamber through lines 9, 11 and 13. Particles of iron powder which are entrained by the gases leaving the chamber are separated from the gas by means of the filter 12 and withdrawn through a valve 10. From the chamber the iron powder is drawn off through the valve 14. In the present invention, it is necessary to insure that sufficient heat be supplied to the decomposition space in the chamber to substantially completely decompose the quantity of at least 22 kilograms of iron carbonyl per hour per cubic meter supplied to the chamber. In providing this large quantity of heat to the interior, to effect the much greater quantity of decomposition, it is important that the inner wall of the decomposition chamber be at a temperature not higher than that which will produce carbon by decomposition of carbon monoxide. In other words, the temperature differential, or $\Delta t$, from the inner wall to the interior of the decomposition space is not raised, but the quantity of heat transmitted to the space is increased. This is accomplished, for example, by supplying a greater quantity of heating gases to the jacket, but at no higher temperature. Alternatively, the heat transmitting surface of the chamber wall may be enlarged, or a more conductive material may be employed in the construction of the wall. On the other hand, increasing the quantitative heat transferred by increasing the temperature of the heating medium results in increased inner wall temperature and the production of iron powder having an unsuitable carbon content and magnetic properties.

The process of the present invention can be used together with appropriate prior methods for producing fine particles, to further reduce the particle size, if desired. Thus, the iron carbonyl vapor can be diluted with a vapor or gas, such as carbon monoxide. Even a 1:1 dilution has a favorable effect. In this manner, by decomposing at least 22 kilograms per hour of iron carbonyl per cubic meter of space, together with dilution of the carbonyl vapor, it is possible to obtain a powder having an exceptionally small apparent density, which forms flocs consisting of particles usually less than 1 micron in size. Also, when diluting the carbonyl vapor with carbon monoxide, the carbon monoxide can be heated and thus supply part of the heat necessary for the decomposition and reduce the requirements for heat transmitted through the wall of the decomposition chamber.

While observing the above described conditions, the decomposition may be carried out by applying a reduced pressure through the exit from the chamber or causing the decomposition to take place against superatmospheric back pressure. However, an important advantage of the invention is that the decomposition may be carried out at about atmospheric pressure, that is, at the pressure existing in the system when the gases exit to atmospheric pressure with no application of reduced or increased pressure.

While the residence time of the particles in the decomposition zone may be reduced according to prior methods, such a condition is unnecessary, as the iron particles may remain in the decomposition zone for, e. g., 100 seconds without adverse effect.

The following examples illustrate the invention and also illustrate the surprising and unexpected nature thereof, but it is to be understood that the invention is not limited to the specific conditions and procedures set forth therein, which are only illustrative.

Example 1

A decomposition chamber, as shown in the figure, was provided which had an inner diameter of 1 meter and a length of 5 meters, and which was surrounded with a jacket for heating the chamber by the circulation of hot gases in the jacket. The hot gases come from a suitable furnace and were blended or mixed with a portion of the cooler spent heating gases leaving the jacket, to maintain the temperature in the decomposition space at about 260° C.

60 kilograms of iron carbonyl vapor diluted with ammonia in an amount corresponding to 4% by volume of the carbon monoxide originating from the decomposition of the carbonyl were supplied to the decomposition chamber per hour. This was equivalent to a throughput of about 15 kilograms per hour per cubic meter of decomposition space, which was previously believed to be the maximum attainable to produce an iron powder containing particles which are suitable for high frequency cores and the like. The gases exited to substantially atmospheric pressure. An iron powder having the following particle size distribution was obtained:

|  | Microns |
|---|---|
| 50% | 2-5 |
| 30% | 5-7 |
| 20% | 7-10 |

The average carbon content of the particles was 0.75%.

Example 2

In the manner described in Example 1, 88 kilograms of iron carbonyl containing the same relative proportion of ammonia were supplied to the decomposition chamber per hour. This corresponded to a supply of about 22 kilograms per hour per cubic meter of decomposition space. The gases left the chamber to substantially atmospheric pressure. The heating gas supplied to the jacket was at the same temperature as before but the quantity of heating gas supplied was about 50% greater. The temperature of the decomposition space was about the same as in Example 1.

A much finer powder having the following particle size distribution was obtained:

|  | Microns |
|---|---|
| 82% | up to 5 |
| 18% | 5-6 |

The average carbon content of the particles was 0.71%.

Example 3

In the manner described in Example 1, 120 kilograms of iron carbonyl containing the same relative proportion of ammonia were supplied to the decomposition chamber per hour. This corresponded to a supply of about 30 kilograms per hour per cubic meter of decomposition space. The gases left the chamber to substantially atmospheric pressure. The heating gas supplied to the jacket was at the same temperature as before, but the quantity of heating gas supplied was about doubled. The temperature of the decomposition space was about the same as in Example 1.

The powder which was obtained had a particle size distribution as follows:

|  | Microns |
|---|---|
| 75% | up to 3 |
| 25% | 3-5 |

The average carbon content of the particles was 0.69%.

Example 4

In the manner described in Example 3, 125.5 kilograms of iron carbonyl containing ammonia in the same amount as in Example 1 were supplied to the decomposition chamber per hour. The temperature of the inner wall of the chamber and the decomposition temperature were the same as in Example 3, but a greater quantity of heating gas was supplied corresponding to the increased quantity of iron carbonyl supplied, to the decomposition space.

The powder produced had the following particle size distribution:

|  | Microns |
|---|---|
| 37.4% | up to 1 |
| 29.6% | 1-2 |
| 20.4% | 2-3 |
| 8.3% | 3-4 |
| 4.3% | 4-5 |

The further increase in quantity of iron carbonyl decomposed from Example 3 produced a greater proportion of particles of 3 microns and less. A small quantity of particles between 4 and 5 microns was obtained, indicating that some relatively small variation in maximum particle size is encountered. The average carbon content of the powder was 0.69%.

Example 5

Observing the above conditions, as in Example 4, 175 kilograms of iron carbonyl were decomposed per hour. The iron powder obtained had the following particle size distribution:

|  | Microns |
|---|---|
| 76.5% | up to 1 |
| 13.2% | 1–2 |
| 7.8% | 2–3 |
| 2.5% | 3–4 |

The carbon content and magnetic properties were likewise as desired for high frequency applications.

Example 6

In like manner, the amount of iron carbonyl decomposition was increased to 184 kilograms per hour. The iron powder particle size distribution was as follows:

|  | Microns |
|---|---|
| 77% | up to 1 |
| 18% | 1–2 |
| 4% | 2–3 |
| 1% | 3–4 |

The carbon content and magnetic properties were likewise suited for high frequency purposes.

It will be observed on comparison of this example with Examples 4 and 5 that the proportion of smaller particles increases with increasing quantity of iron carbonyl decomposition. In particular, over three-fourths of the particles have a size of 1 micron or less and substantially 90% or more of the particles have a size of 2 microns or less at a decomposition rate of 175 kilograms per hour or greater, corresponding to a quantitative decomposition of about 45 kilograms per hour per cubic meter. Further reduction in particle size can be obtained by increasing the quantity of iron carbonyl decomposition per unit of time and volume. These extremely fine iron powders are especially suitable for the preparation of cores for the radio and television industries.

The invention thus embodies the discovery of a new phenomenon and condition in the production of fine iron powder, that the iron carbonyl be decomposed in a hitherto unknown quantity per unit of time and volume. The invention provides a great increase in the production of the very fine iron powders, by an exceptionally simple and very reliable method. The powders can be used without further treatment for the manufacture of high frequency cores and for powder metallurgical purposes.

We claim:

1. In the production of iron powder by thermal decomposition of iron carbonyl vapor in the hot free space of a decomposition chamber, the improvement for producing iron powder in which the particle size of substantially all of the particles does not exceed 5 microns which comprises supplying at least about 30 kilograms per hour of iron carbonyl per cubic meter of decomposition space to said free space, and substantially completely decomposing said quantity of iron carbonyl therein, by maintaining the decomposition temperature within the range of 200° C. to 300° C. and supplying sufficient heat to said free space to produce said complete decomposition within said temperature range.

2. In the production of iron powder by thermal decomposition of iron carbonyl vapor in the hot free space of a decomposition chamber, the improvement for producing iron powder in which the particle size of substantially all of the particles does not exceed 5 microns which comprises supplying at least about 30 kilograms per hour of iron carbonyl per cubic meter of decomposition space to said free space at about atmospheric pressure, and substantially completely decomposing said quantity of iron carbonyl therein, by maintaining the decomposition temperature within the range of 200° C. to 300° C. and supplying sufficient heat to said free space to produce said complete decomposition within said temperature range.

3. In the production of iron powder by thermal decomposition of iron carbonyl vapor in the hot free space of a decomposition chamber, the improvement for producing iron powder in which the particle size of substantially all of the particles does not exceed 5 microns which comprises supplying at least about 30 kilograms per hour of iron carbonyl per cubic meter of decomposition space to said free space, and substantially completely decomposing said quantity of iron carbonyl therein, by maintaining the decomposition temperature within the range of 230° C. to 280° C. and supplying sufficient heat to said free space to produce said complete decomposition within said temperature range.

4. In the production of iron powder by thermal decomposition of iron carbonyl vapor in the hot free space of a decomposition chamber, the improvement for producing iron powder in which the particle size of substantially all of the particles does not exceed 3 microns which comprises supplying at least about 43 kilograms per hour of iron carbonyl per cubic meter of decomposition space to said free space, and substantially completely decomposing said quantity of iron carbonyl therein, by maintaining the decomposition temperature within the range of 200° C. to 300° C. and supplying sufficient heat to said free space to produce said complete decomposition within said temperature range, at least part of the heat required being supplied through the wall of said chamber, the temperature of the inner surface of said wall being maintained not substantially higher than the decomposition temperature of carbon monoxide.

References Cited in the file of this patent

UNITED STATES PATENTS

| 1,836,732 | Schlecht et al. | Dec. 15, 1931 |
| 2,597,701 | Beller | May 20, 1952 |

OTHER REFERENCES

Symposium on Powder Metallurgy, published by the Iron and Steel Institute, London, England, December 1947, pages 48 and 49.